United States Patent
Ling

(10) Patent No.: US 9,380,348 B2
(45) Date of Patent: Jun. 28, 2016

(54) HYBRID REDUNDANCY FOR ELECTRONIC NETWORKS

(71) Applicant: MaxLinear, Inc., Carlsbad, CA (US)

(72) Inventor: Curtis Ling, Carlsbad, CA (US)

(73) Assignee: Maxlinear, Inc., Carlsbad, CA (US)

(*) Notice: Subject to any disclaimer, the term of this patent is extended or adjusted under 35 U.S.C. 154(b) by 291 days.

(21) Appl. No.: 14/188,091

(22) Filed: Feb. 24, 2014

(65) Prior Publication Data

US 2014/0245059 A1  Aug. 28, 2014

Related U.S. Application Data

(60) Provisional application No. 61/767,914, filed on Feb. 22, 2013.

(51) Int. Cl.
| | |
|---|---|
| G06F 11/00 | (2006.01) |
| H04N 21/61 | (2011.01) |
| H04H 20/78 | (2008.01) |
| H04L 12/413 | (2006.01) |
| H04H 20/69 | (2008.01) |

(52) U.S. Cl.
CPC .......... *H04N 21/6118* (2013.01); *H04H 20/78* (2013.01); *H04L 12/413* (2013.01); *H04H 20/69* (2013.01)

(58) Field of Classification Search
CPC ............ G06F 11/3006; G06F 11/3041; G06F 11/3055; G06F 11/32; G06F 11/325; G06F 2201/84; G06F 2201/815; G06F 2201/805; G06F 2201/86; H04L 41/24
See application file for complete search history.

(56) References Cited

U.S. PATENT DOCUMENTS

| | | | | |
|---|---|---|---|---|
| 6,314,525 B1* | 11/2001 | Mahalingham | ..... | H04L 12/2856 370/217 |
| 6,512,774 B1* | 1/2003 | Vepa | ....... | H04L 69/40 370/242 |
| 6,516,352 B1* | 2/2003 | Booth | .... | H04L 12/403 370/463 |
| 6,795,933 B2* | 9/2004 | Wachel | ...... | H04L 1/22 370/216 |
| 8,134,928 B1* | 3/2012 | Manickavasagam | ..... | H04L 1/24 370/242 |
| 2002/0078395 A1* | 6/2002 | Wachel | .... | G06F 11/2005 714/4.12 |
| 2007/0268820 A1* | 11/2007 | McGee | ..... | H04B 3/46 370/217 |
| 2009/0158107 A1* | 6/2009 | Mayer | .... | G06F 11/267 714/734 |

* cited by examiner

*Primary Examiner* — Bryce Bonzo
*Assistant Examiner* — Jeison C Arcos
(74) *Attorney, Agent, or Firm* — McAndrews, Held & Malloy, Ltd.

(57) ABSTRACT

Aspects of a method and system for hybrid redundancy for electronic networks are provided. A first line card may comprise a first instance of a network layer circuit, a first instance of a physical layer circuit, and an interface to a data bus (e.g., an Ethernet bus) for communicating with a second line card. In response to detecting a failure of the first instance of the network layer circuit, the first instance of the physical layer circuit may switch from processing of a signal received via the first instance of the network layer circuit to processing of a signal received via the interface. The system may comprise a second line card. The second line card may comprise a second instance of the network layer circuit. The second instance of the network layer circuit may be coupled to the data bus.

16 Claims, 7 Drawing Sheets

US 9,380,348 B2

HYBRID REDUNDANCY FOR ELECTRONIC NETWORKS

PRIORITY CLAIM

This application claims priority to the following application(s), each of which is hereby incorporated herein by reference:

U.S. provisional patent application 61/767,914 titled "Hybrid Redundancy for Electronic Networks" filed on Feb. 22, 2013.

TECHNICAL FIELD

Certain embodiments of the invention relate to electronic networking. More specifically, certain embodiments of the invention relate to methods and systems for hybrid redundancy.

BACKGROUND

Existing methods and systems for providing network access are inadequate for meeting the needs of current, and next-generation electronic networks. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for hybrid redundancy for electronic networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1A:
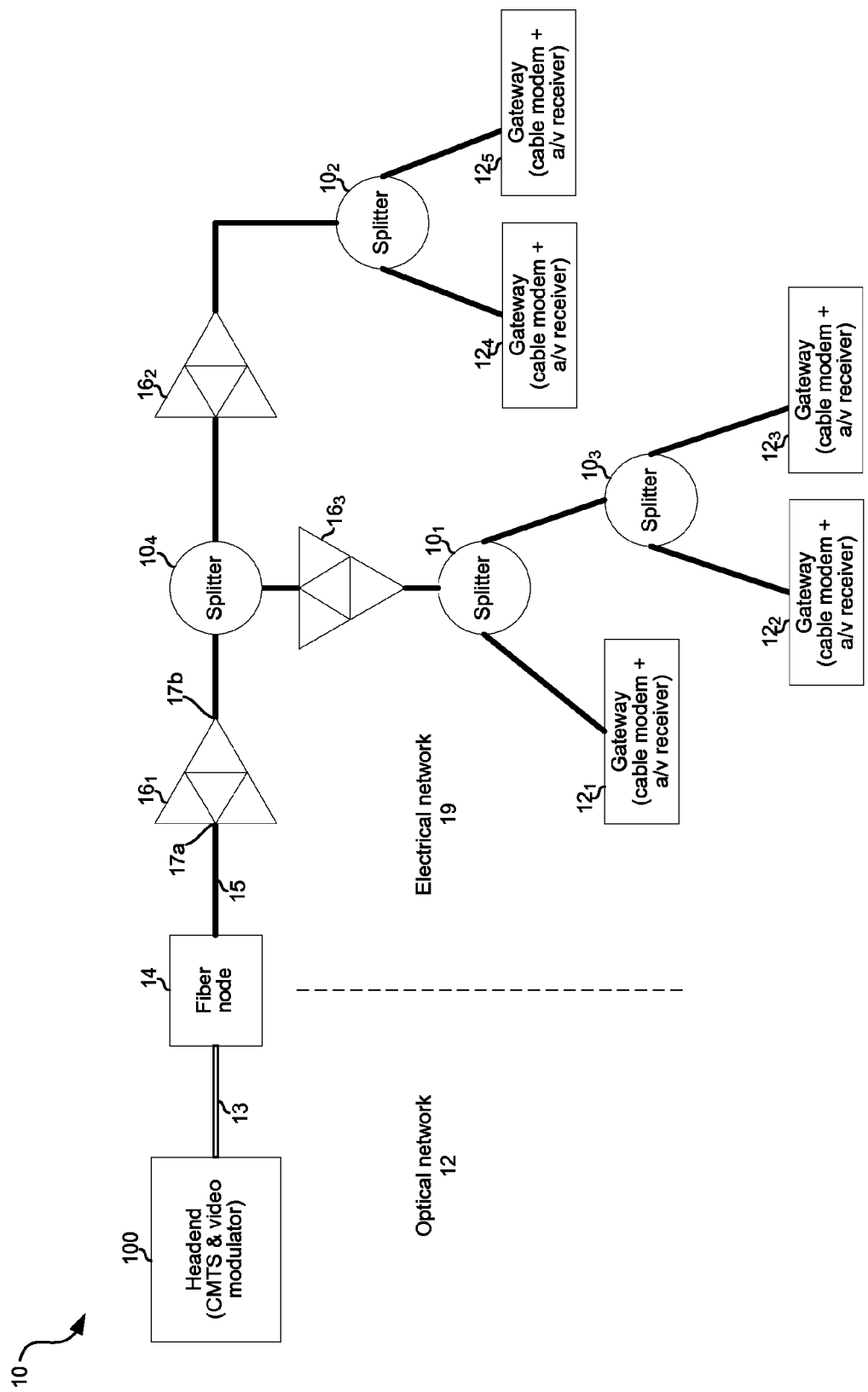
FIG. 1A is a diagram depicting an example hybrid fiber-coaxial (HFC) network.

FIG. 1A is a diagram depicting an example hybrid fiber-coaxial (HFC) network. The example HFC network 10 comprises a headend 100, a fiber node 14, amplifiers $16_1$-$16_3$, splitters $10_1$-$10_4$, and gateways $12_1$-$12_5$.

The headend 100 comprises a cable modem termination system (CMTS) for handling data over coaxial service interface specification (DOCSIS) traffic to and from the cable modems of gateways $12_1$-$12_5$ and one or more modulators (e.g., one or more "edge QAMs") for handling downstream multimedia traffic to the audio/video receivers of the gateways $12_1$-$12_5$. Details of an example headend in accordance with various implementations of this disclosure are described below with reference to FIGS. 1B-4.

The fiber node 14 may provide an interface between the optical network 12 and the electrical network 19.

Each of the amplifiers $16_1$-$16_3$ may comprise a bidirectional amplifier which may amplify downstream signals and upstream signals, where downstream signals are input via upstream interface 17a and output via downstream interface 17b, and upstream signals are input via downstream interface 17b and output via upstream interface 17a. The amplifier $16_1$, which amplifies signals along the main coaxial "trunk," may be referred to as a "trunk amplifier." The amplifiers $16_2$ and $16_3$, which amplify signals along "branches" split off from the trunk, may be referred to as "branch" or "distribution" amplifiers.

Each of the splitters $10_1$-$10_4$ comprises circuitry operable to output signals incident on each of its interfaces onto each of its other interfaces. Each of the splitters $10_1$-$10_4$ may be a passive or active device which supports bidirectional transfer of signals.

Each of the gateways $12_1$-$12_5$ may comprise cable modem circuitry operable to communicate with, and be managed by, the headend 100 in accordance with one or more standards (e.g., DOCSIS). Each of the gateways $12_1$-$12_5$ may comprise one or more audio/video receivers operable to receive multimedia content (e.g., in the form of one or more MPEG streams) transmitted by the headend 100 in accordance with one or more standards used for cable television. Each of the gateways $12_1$-$12_5$ may reside at the premises of a cable/DOCSIS subscriber.

Figure 1B:
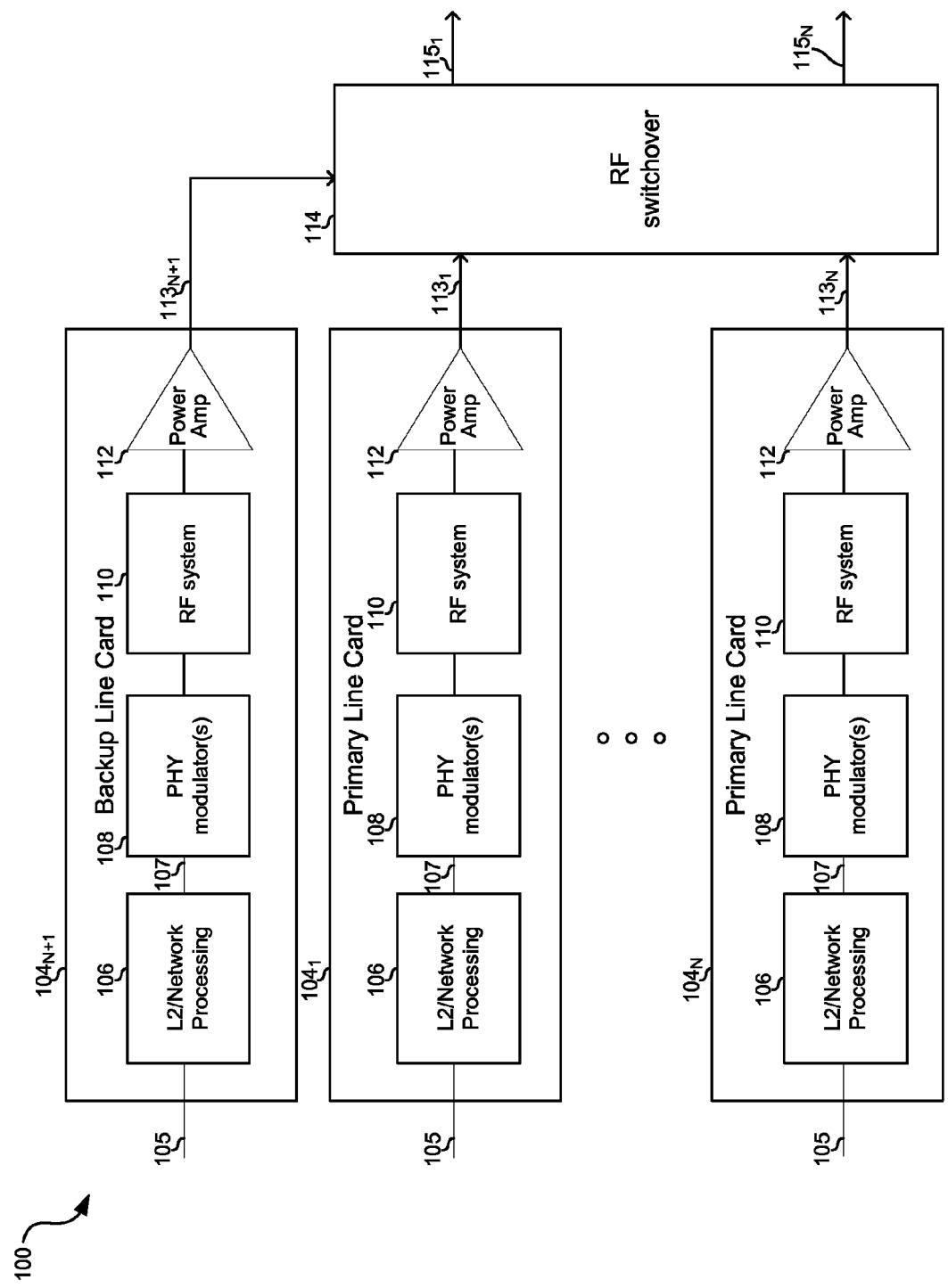
FIG. 1B is a diagram illustrating transmit components of a first system with redundancy.

FIG. 1B is a diagram illustrating transmit components of a first system with redundancy. Depicted is an example system 100 comprising a plurality of primary line cards $104_1$-$104_N$, a backup line card $104_{N+1}$, and an RF switchover circuit 114. Each of the line cards comprises a L2 processing circuit 106, a physical layer modulator circuit 108, an RF circuit 110, and a power amplifier circuit (PA) 112. The system 100 may be, for example, part of a network server, switch, router, cable modem termination system (CMTS), fiber node (i.e., device of HFC network which converts interfaces one or more optical links from the headend with one or more coaxial cable trunks) and/or other networking device. In an example implementation, the system 100 resides at a headend or fiber node.

Each line card $104_n$ ($1 \leq n \leq N$) may receive an input signal 105. In an example implementation, the signal 105 may be, for example, from a cable service provider core network where the system 100 is at the headend. In an example implementation, the signal 105 may be, for example, from a headend where the system 100 is in a fiber node. The signal 105 may be processed by L2 processing circuit 106 of each card $104_1$-$104_{N+1}$ (e.g., packetization, logical link layer control (LLC) functions, media access control (MAC) functions, and/or higher OSI layer functions may be performed) to generate a corresponding signal 107. The signal 107 may be processed by corresponding modulator circuit 108, RF circuit 110, and PA 112 (e.g., interleaving, symbol mapping, forward error correction (FEC) encoding, digital to analog conversion, upconversion to RF, amplification, and/or other physical layer functions may be performed according to a determined standard such as DOSCIS) to generate a corresponding one of signals $113_1$-$113_{N+1}$. The RF switchover circuit 114 maps N of the signals $113_1$-$113_{N+1}$ to the signals $115_1$-$115_N$ and is operable to perform failover to swap out a failed line card with a functioning line card. For example, if line card $104_X$ (where $1 \leq X \leq N$) fails, then RF switchover circuit 114 may detect the failure and reconfigure itself to use line card $104_{N+1}$ instead of failed line card $104_X$. That is, the RF switchover circuit 114 may decouple signal $113_X$ from signal $115_X$ and instead couple signal $113_{N+1}$ to signal $115_X$. The signals $115_1$-$115_N$ may be conveyed to, for example, laser modulators in a headend, to coaxial cables in a fiber node, or to antennas in a wireless system.

Figure 1C:
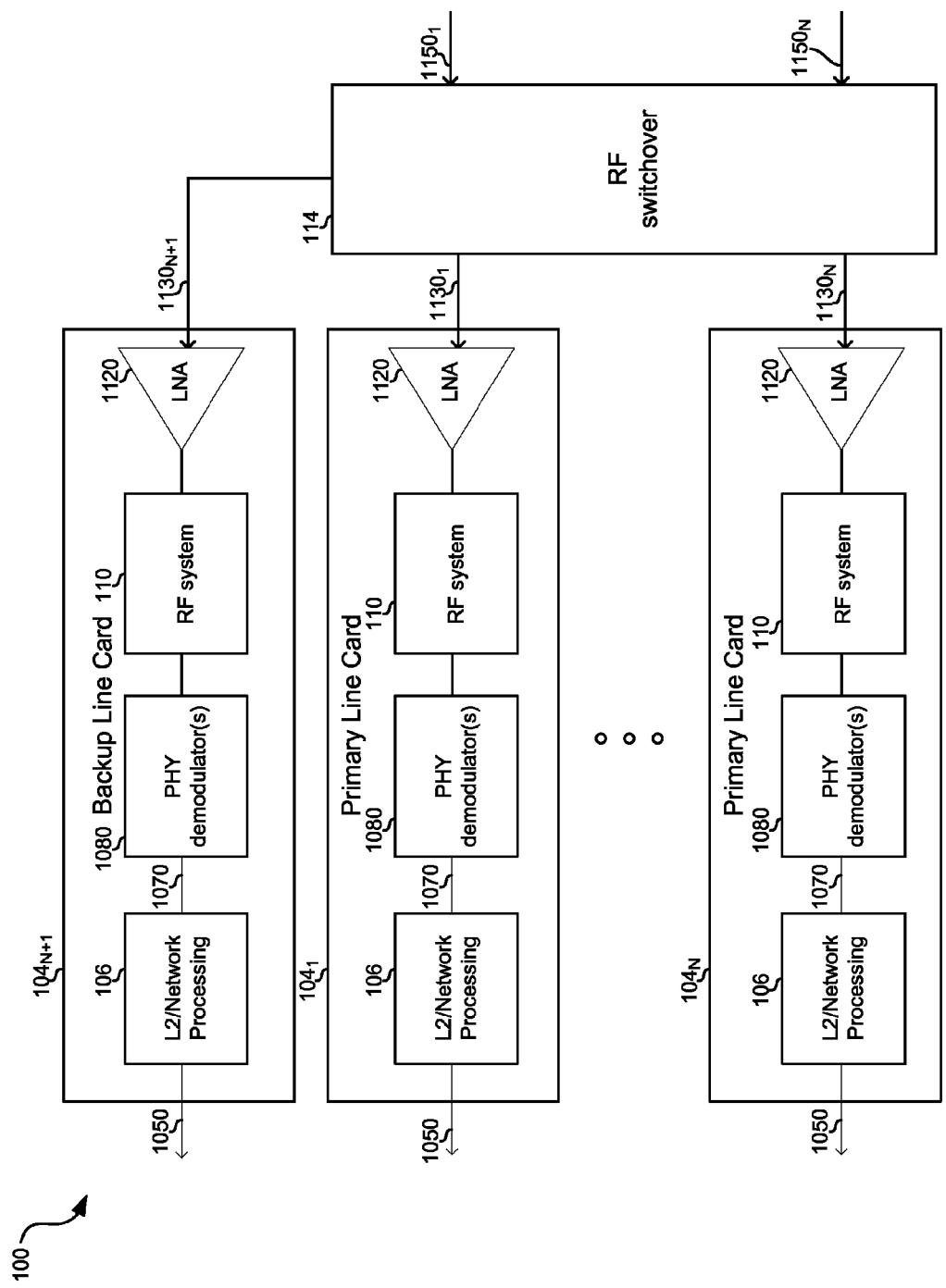
FIG. 1C is a diagram illustrating receive components of the first system of FIG. 1B.

FIG. 1C is a diagram illustrating receive components of the first system of FIG. 1B. In this example, in addition to components already discussed with reference to FIG. 1B (some of which are not shown in FIG. 1C for clarity of illustration) each line card $104_n$ ($1 \leq n \leq N$) comprises a low noise amplifier 1120 and demodulator(s) 1080. Each LNA $1120_n$ ($1 \leq n \leq N+1$) may amplify the signal $1130_n$ ($1 \leq n \leq N+1$). Each demodulator $1080_n$ ($1 \leq n \leq N+1$) may demodulate the upstream signal output by the respective RF system $110_n$.

The RF switchover circuit 114 maps the signals $1150_1$-$1150_{N+1}$ to N of the signals $1130_1$-$1130_{N+1}$ and is operable to perform failover to swap out a failed line card with a functioning line card. For example, if line card $104_X$ (where $1 \leq X \leq N$) fails, then RF switchover circuit 114 may detect the failure and reconfigure itself to use line card $104_{N+1}$ instead of failed line card $104_X$. That is, the RF switchover circuit 114 may decouple signal $1150_X$ from signal $1130_X$ and instead couple signal $1150_X$ to signal $1130_{N+1}$. The upstream signals 1150 may coexist on the same physical medium, or use a different physical medium, as the downstream signals 115 shown in FIG. 1B. Similarly the signals 150 may coexist on the same physical medium, or use a separate physical medium, as the signals 105 shown in FIG. 1B.

Figure 2A:
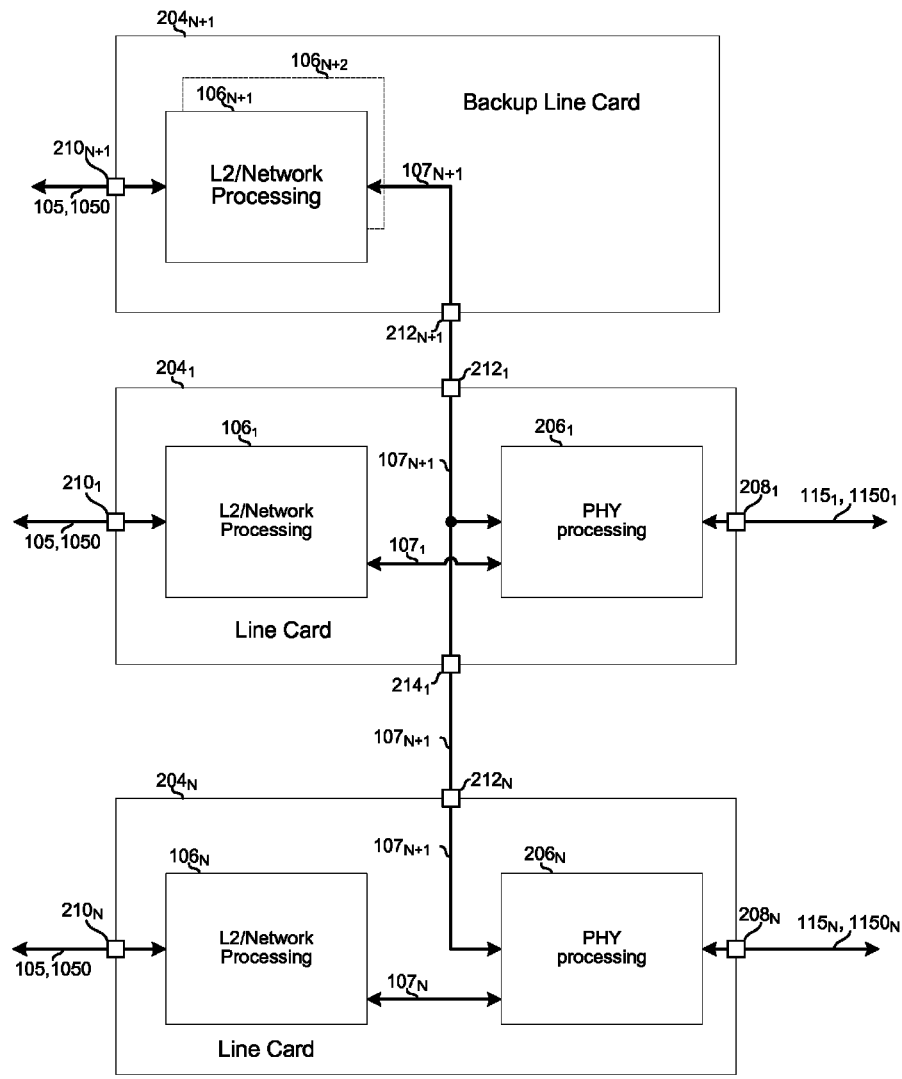
FIG. 2A is a diagram illustrating a second system with redundancy.

FIG. 2A is a diagram illustrating a second system with redundancy. The example system 200 comprises line cards $204_1$-$204_N$ and a line card $204_{N+1}$. The system 200 may be, for example, part of a network server, switch, router, cable modem termination system (CMTS), fiber node, and/or other networking device. In an example implementation, the system 200 resides at a cable headend.

Each line card $204_n$ ($1 \leq n \leq N$) comprises an interface $210_n$ for signal(s) 105 and/or $1050$, a L2 processing circuit $106_n$ (each L2 processing circuit $106_n$ being an instance of L2 processing circuit 106 described above, for example), a physical layer circuit $206_n$ (an example implementation of which is described below with reference to FIGS. 2B and 2C), an interface $208_n$ for signal(s) $115_n$ and/or $1150_n$, and one or more interfaces 212 and/or 214 for connecting to backup line card $204_{N+1}$ (i.e., for exchange of signals $107_{N+1}$). In an example implementation, each of signals $107_1$-$107_N$ and $107_{N+1}$ may be conveyed via a gigabit or 10-gigabit Ethernet link.

The line card $204_{N+1}$ comprises an interface $210_{N+1}$ for signal(s) 105 and/or 1050, a L2 processing circuit $106_{N+1}$ (which is an instance of L2 processing circuit 106 described above, for example), and an interface $212_{N+1}$ for coupling to one or more physical layer circuits $206_n$ (i.e., for exchange of signals $107_{N+1}$). In an example implementation, M (an integer) additional L2 processing circuits $106_{N+2}$-$106_{N+1+M}$ (each being an instance of L2 processing circuit 106 described above, for example) may be implemented on the line card $204_{N+1}$. Circuits $106_{N+1}$-$106_{N+1+M}$ on the line card $204_{N+1}$ enable accommodating failure of M+1 of the L2 processing circuits $106_1$-$106_N$. That is, up to M+1 of the L2 processing circuits $106_1$-$106_N$ may fail without the recipient(s) of signals $115_1$-$115_N$ experiencing any loss of service (except perhaps a temporary disruption while the failover occurs). Where the card $204_{N+1}$ is of the same dimensions/form factor as each of the cards $204_1$-$204_N$, placement of M+1 instances of circuit 106 on the line card $204_{N+1}$ may be possible due to fewer (or no) instances of physical layer circuit 206 on the card $204_{N+1}$.

In the absence of failure of L2 processing circuit $106_n$ ($1 \leq n \leq N$) (or some other upstream component affecting line card $204_n$ such as a splitter providing the signal 105 to card $204_n$), physical layer circuit $206_n$ may process the downstream portion of signal $107_n$ to generate signal $115_n$ and/or process the signal $1150_n$ to generate corresponding upstream portion of signal $107_n$. In the presence of a failure of $106_n$ ($1 \leq n \leq N$), or some other upstream component affecting line card $204_n$, physical layer circuit $206_n$ may process the downstream portion of signal $107_{N+1}$ to generate signal $115_n$ and/or process signal $1150_n$ to generate a corresponding upstream portion of signal $107_{N+1}$. An example implementation of an instance of the physical layer circuit 206 is described below with reference to FIGS. 2B and 2C.

Figure 2B:
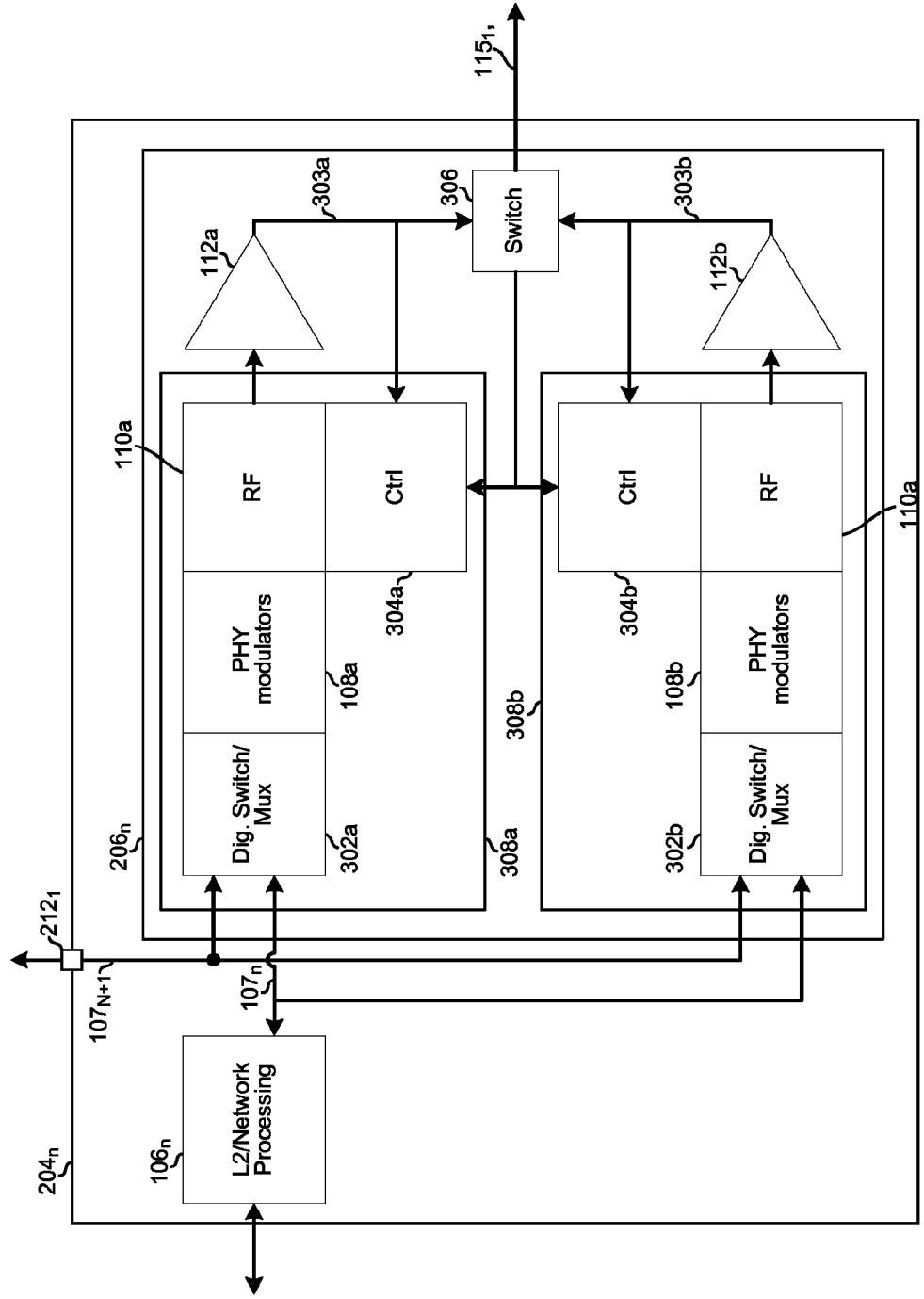
FIGS. 2B and 2C illustrate an example physical layer module for use in the system of FIG. 2A.
Figure 2C:
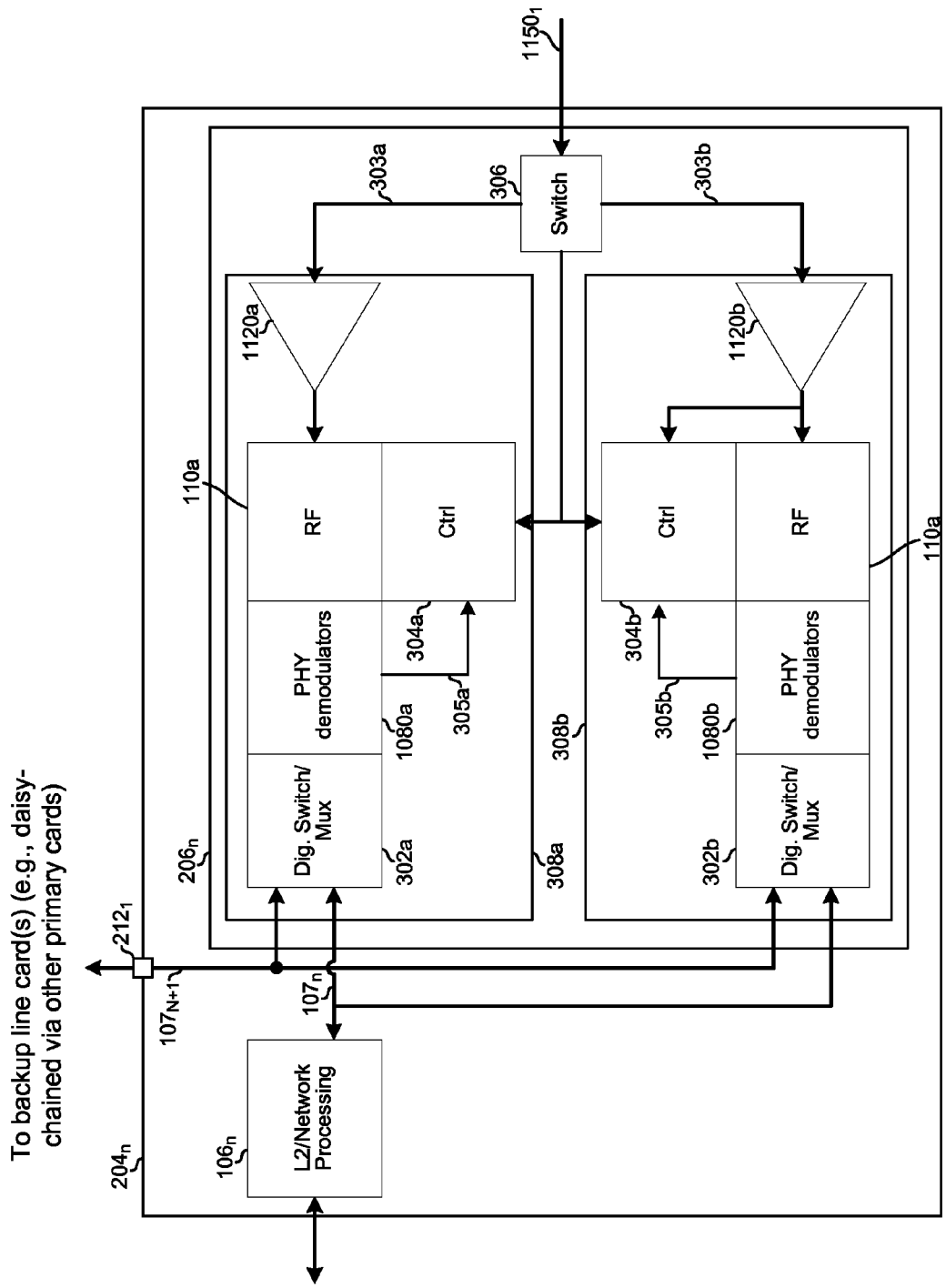

FIGS. 2B and 2C are diagrams illustrating an example physical layer circuit for use in the system of FIG. 2A. For clarity of illustration, the diagram is split into two figures with transmit components shown in FIG. 2B and receive components shown in FIG. 2C. The example line card $204_n$ shown in FIGS. 2B and 2C comprises a L2 processing circuit $106_n$ (described above), physical layer circuit $206_n$, PAs 112a and 112b, LNAs 1120a and 1120b, and switch 306. Each of 108a and 108b may be an instance of PA 112 of FIG. 1B, for example. The physical layer circuit $206_n$ comprises primary circuit 308a and backup circuit 308b. Primary circuit 308a comprises digital switching/multiplexing circuit 302a, PHY modulator circuit 108a, PHY demodulator circuit 1080a, RF circuit 110a, and control circuit 304a. Similarly, backup circuit 308b comprises digital switching/multiplexing circuit 302b, PHY modulator circuit 108b, PHY demodulator circuit 1080b, RF circuit 110b, and control circuit 304b. Each of 108a and 108b may be an instance of modulator circuit 108 of FIG. 1B, for example. Each of 1080a and 1080b may be an instance of modulator circuit 1080 of FIG. 1C, for example. Each of 110a and 110b may be an instance of RF circuit 110 of FIG. 1B, for example. In an example implementation, primary circuit 308a and LNA 1120a is on a first semiconductor die, backup circuit 308b and LNA 1120b is on a second semiconductor die, PA 112a is on a third semiconductor die, PA 112*b* is on a fourth semiconductor die, and switch 306 is on a fifth semiconductor die. In other example implementations, any two or more of 308*a*, 308*b*, 112*a*, 112*b*, and 306 may be integrated on a shared semiconductor die.

The switching/multiplexing circuit 302*a* may be operable to select which of signals 107$_n$ and 107$_{N+1}$ are coupled to modulator circuit 108*a* and demodulator circuit 1080*a*. Which of the signals 107$_n$ and 107$_{N+1}$ is selected may be based on a control signal from control circuit 304*a* that indicates whether L2 processing circuit 106$_n$ of the card 204$_n$ has failed. If 106$_n$ has failed, the switching/multiplexing circuit 302*a* may be configured to select signal 107$_{N+1}$. In an example implementation, the switching/multiplexing circuit 302*a* may operate as a layer 2 (or higher layer) switch (e.g., an Ethernet switch) for switching traffic among L2 processing circuit 106$_n$, L2 processing circuit 106$_{N+1}$, modulator circuit 108*a*, and demodulator circuit 1080*a*. State information, failure notifications, and/or other traffic may be exchanged among L2 processing circuits 106$_1$-106$_{N+1}$. Monitoring/sensing that the control circuit 304*a* may perform to detect a failure may include, for example, monitoring/sensing voltage, current, power levels, and/or other characteristics of the signal 303*a*; monitoring/sensing current drawn by one or more of the switching/multiplexing circuit 302*a*, modulator circuit 108*a*, demodulator circuit 1080*a*, RF circuit 110*a*, PA 112*a*, and LNA 1120*a*, and/or monitoring a temperature of one or more of the switching/multiplexing circuit 302*a*, modulator circuit 108*a*, demodulator circuit 1080*a*, RF circuit 110*a*, PA 112*a*, and LNA 1120*a*. In an example implementation, based on the sensing/monitoring, the control circuit 304*a* may be operable to predict a failure rather than waiting for a failure.

The switching/multiplexing circuit 302*b* may be operable to select which of signals 107$_n$ and 107$_{N+1}$ are coupled to modulator circuit 108*b* and demodulator circuit 1080*b*. Which signal is selected may be based on a control signal from control circuit 304*b* that indicates whether L2 processing circuit 106$_n$ of the card 204$_n$ has failed. If 106$_n$ has failed, the switching/multiplexing circuit 302*b* may select signal 107$_{N+1}$. In an example implementation, the switching/multiplexing circuit 302*b* may operate as a layer 2 (or higher layer) switch (e.g., an Ethernet switch) for switching traffic among L2 processing circuit 106$_n$, L2 processing circuit 106$_{N+1}$, modulator circuit 108*b*, and demodulator circuit 1080*b*. State information, failure notifications, and/or other traffic may be exchanged among L2 processing circuits 106$_1$-106$_{N+1}$. Monitoring/sensing that the switching/multiplexing circuit 302*b* may perform to detect a failure may include, for example, monitoring/sensing voltage, current, power levels, and/or other characteristics of the signal 303*b*; monitoring/sensing current drawn by one or more of the switching/multiplexing circuit 302*b*, modulator circuit 108*b*, demodulator circuit 1080*b*, RF circuit 110*b*, PA 112*b*, and LNA 1120*b*, monitoring a temperature of one or more of the switching/multiplexing circuit 302*b*, modulator circuit 108*b*, demodulator circuit 1080*b*, RF circuit 110*b*, PA 112*b*, and LNA 1120*b*. In an example implementation, based on the sensing/monitoring, the control circuit 304*b* may be operable to predict a failure rather than waiting for a failure.

Processing of the output of switching/multiplexing circuit 302*a* by the modulator circuit 108*a*, RF circuit 110*a*, and PA 112*a* may be substantially similar to processing by modulator circuit 108, RF circuit 110, and PA 112 described above with reference to FIG. 1B. Similarly, processing of the output of switching/multiplexing circuit 302*b* by the modulator circuit 108*b*, RF circuit 110*b*, and PA 112*b* may be substantially similar to processing by modulator circuit 108, RF circuit 110, and PA 112 described above with reference to FIG. 1B.

Processing of upstream signals by the demodulator 1080*a* and LNA 1120*a* may be substantially similar to processing by demodulator circuit 1080 and LNA 1120 described above with reference to FIG. 1C. Similarly, Processing of upstream signals by the demodulator 1080*b* and LNA 1120*b* may be substantially similar to processing by demodulator circuit 1080 and LNA 1120 described above with reference to FIG. 1C.

The control circuit 304*a* may monitor the signals 303*a* and/or 305*a* to detect problems with the circuit 308*a*. Similarly, the control circuit 304*b* may monitor the signals 303*a* and/or 305*a* to detect problems with the circuit 308*a*. If a problem is detected, the control circuits 304*a* and 304*b* may, through a failover negotiation algorithm, reconfigure the switch 306 to select the non-failed one of the circuits 308*a* and 308*b* and/or may reconfigure or more of 302*a*, 302*b*, 108*a*, 108*b*, 110*a*, 110*b*, 112*a*, and 112*b*.

In an example implementation, during normal operation, the circuit 308*a* and PA 112*a* may be active and the signal 303*a* may be selected for use by the switch 306. During such normal operation, the circuit 308*b* may be in a low-power state (e.g., one or more of switching/multiplexing circuit 302*b*, modulator circuit 108*b*, demodulator circuit 1080*b*, RF circuit 110*b*, and LNA 1120*b* may be powered down) and/or the PA 112*b* may be in a low power state. In this manner, although there are almost twice as many PHY circuits in the system of FIGS. 2A-2C, as compared to the system of FIG. 1B, power consumption in the line cards may increase only slightly due to only half operating at any given time, and a net power savings may be achieved due to elimination of the RF switchover circuit 114.

Upon a failure of switching/multiplexing circuit 302*a*, modulator circuit 108*a*, demodulator circuit 1080*a*, RF circuit 110*a*, LNA 1120*a*, and/or PA 112*a*, the control circuit 304*a* may detect the failure and coordinate, with control circuit 304*b*, a transition (e.g., by reconfiguring one or more of 302*a*, 302*b*, 108*a*, 108*b*, 1080*a*, 1080*b*, 110*a*, 110*b*, 112*a*, 112*b*, 1120*a*, 1120*b*, and 306) such that the circuit 308*b* powers up, the switch 306 selects the signal 303*b*, and the circuit(s) 308*a* and/or PA 112*a* are put in a low-power state. Additionally, an error message may be generated and transmitted. In an example implementation, during normal operation the backup circuit 308*b* may be in a low-power mode that enables very fast switchover from circuit 308*a* to 308*b* in the event of a failure. To this end, the control circuits 304*a* and 304*b* may occasionally and/or periodically exchange state information for the switching/multiplexing circuit 302*a*, modulator circuit 108*a*, demodulator circuit 1080*a*, RF circuit 110*a*, and/or PA 112*a* which may be used by switching/multiplexing circuit 302*b*, modulator circuit 108*b*, demodulator circuit 1080*b*, RF circuit 110*b*, and/or PA 112*b* for quickly coming on-line. Example state information includes contents of PHY modulators, timing/synchronization information, power levels, gain settings, measured channel characteristics, filter tap coefficients, and/or the like. In an example implementation, although the system 200 has almost twice the number of PAs as the system 100, only one of the amplifiers operating at a time may permit the two amplifiers to be placed next to each other and share a heat sink.

In an example implementation, the control circuits 304*a* and 304*b* may perform sensing/monitoring and report the results of such sensing/monitoring to one or more of the L2 processing circuits 106$_1$-106$_{N+1}$ which may then perform failure determination and failover coordination, and may trigger reconfiguration of components 308a and 308b, as necessary.

One advantage of the system of FIGS. 2A-2C over the system of FIGS. 1B-1C may be the elimination of the RF switchover circuit 114. This is an advantage because the RF switchover circuit 114 often takes up an entire server rack and comprises expensive RF components. Thus, the system of FIGS. 2A-2C may provide cost and space savings. Relatedly, another advantage of the system of FIGS. 2A-2C may be that all RF processing is confined to the line cards. This may improve emissions, interference, and/or other issues. Furthermore, the interconnection of line cards using standardized digital communications (e.g., Ethernet) may be simpler, cheaper, and more flexible that performing failover in the RF switchover circuit 114.

One advantage of the system of FIGS. 2A-2C over the system of FIGS. 1B-1C may be that, in the system of FIGS. 2A-2C, multiple PHY failures can be tolerated, whereas in the system of FIGS. 1B-1C, there is only one redundant PHY.

Figure 3:
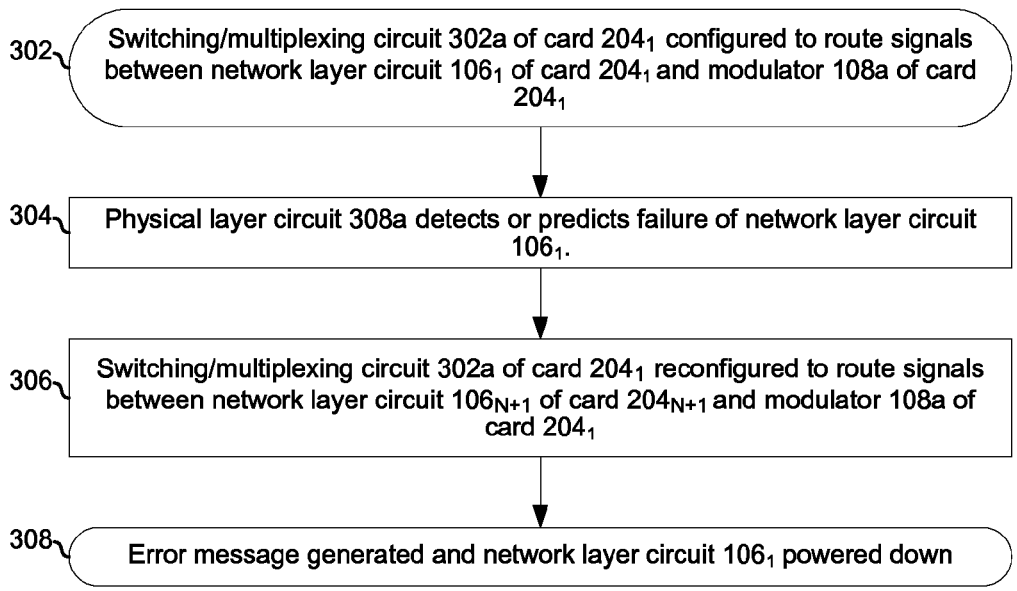
FIG. 3 is a flowchart illustrating an example process for recovering from failure of an L2 processing circuit.

FIG. 3 is a flowchart illustrating an example process for recovering from failure of an L2 processing circuit. The process begins with block 302 in which switching/multiplexing circuit 302a of card 204$_1$ is configured to route signals between network layer circuit 106$_1$ of card 204$_1$ and modulator 108a/demodulator 1080a of card 204$_1$. In block 304, physical layer circuit 308a of card 204$_1$ detects or predicts failure of network layer circuit 106$_1$. In block 306, switching/multiplexing circuit 302a of card 204$_1$ is reconfigured to route signals between network layer circuit 106$_{N+1}$ of card 204$_{N+1}$ and modulator 108a/demodulator 1080a of card 204$_1$. In block 308, an error message is generated (e.g., to alert a network administrator of the failure) and network layer circuit 106$_1$ is powered down.

Figure 4:
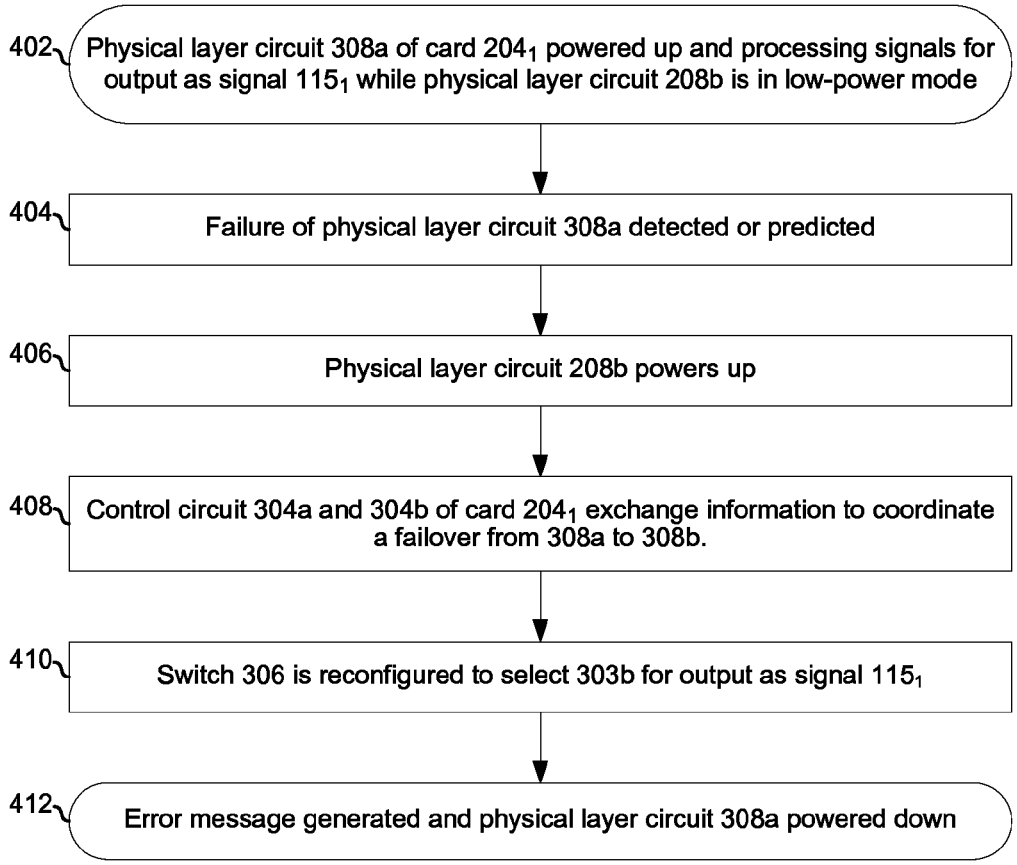
FIG. 4 is a flowchart illustrating an example process for recovering from failure of a physical layer circuit.

FIG. 4 is a flowchart illustrating an example process for recovering from failure of a physical layer circuit. The process begins with block 402 in which physical layer circuit 308a of card 204$_1$ is powered up and is processing received signal 1150$_1$ and/or outputting signal 115$_1$ via switch 306, while physical layer circuit 208b is in a low-power mode. In block 404, a failure of physical layer circuit 308a is detected or predicted (e.g., based on monitoring of signal 303a). In block 406, the physical layer circuit 208b is powered up in response to the detection or prediction of failure in block 404. In block 408, control circuits 304a and 304b of card 204$_1$ exchange information to coordinate a failover. In block 410, switch 306 is reconfigured to switch from a configuration in which signal(s) 115$_1$ and/or 1150$_1$ and signal 303a coupled to a configuration in which signal(s) 115$_1$ and/or 1150$_1$ and signal 303b are coupled. In block 412, an error message is generated (e.g., to alert a network administrator of the failure) and physical layer circuit 308a is powered down.

In an example implementation of this disclosure, a first line card (e.g., 104$_1$ or 204$_1$) may comprise a first instance of a network layer circuit (e.g., 106$_1$), a first instance of a physical layer circuit (e.g., 308a), and an interface (e.g., 212$_1$) to a data bus (e.g., an Ethernet bus) for communicating with a second line card (e.g., 204$_{N+1}$). In response to detecting a failure of the first instance of the network layer circuit, the first instance of the physical layer circuit may switch from processing of a signal (e.g., 107$_n$) received via the first instance of the network layer circuit to processing of a signal (e.g., 107$_{n+1}$) received via the interface. The system may comprise a second line card. The second line card may comprise a second instance of the network layer circuit (e.g., 106$_{N+1}$). The second instance of the network layer circuit may be coupled to the data bus (e.g., via interface 212$_{N+1}$). The second line card may comprise a third instance of the network layer circuit (e.g., 106$_{N+2}$). An output of the third instance of the network layer circuit may be coupled to the data bus (e.g., via interface 212$_{N+1}$). The second line card may not comprise any instances of any physical layer circuit (i.e., may only have circuitry that performs OSI layer 2 and/or higher layer functions). The second line card may have the same form factor as the first line card (e.g., may plug into the same type of socket that the first line card plugs into).

The first line card may comprise a second instance of the physical layer circuit (e.g., 308b). In response to detecting a failure of the first instance of the network layer circuit, the second instance of the physical layer circuit may switch from processing of a signal received via the first instance of the network layer circuit (e.g., 107$_n$) to processing of a signal received via the interface (e.g., 107$_{n+1}$). Upon a detection of a failure of the first instance of the physical layer circuit, the first instance of the physical layer circuit may communicate with the second instance of the physical layer circuit to effect a failover from the first instance of the physical layer circuit to the second instance of the physical layer circuit. The first instance of the second circuit may be coupled to a first power amplifier (e.g., 112a). The second instance of the second circuit may be coupled to a second power amplifier (e.g., 112b). The first instance of the physical layer circuit may be operable to detect the failure by monitoring an output of the first power amplifier.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   a first line card comprising a first instance of a network layer circuit, a first instance of a physical layer circuit, and an interface to a data bus for communication with a second line card, wherein:
   said first instance of said physical layer circuit is operable to switch, in response to detection of a failure of said first instance of said network layer circuit, from processing of a signal received via said first instance of said network layer circuit to processing of a signal received via said interface;
   said second line card comprises a second instance of said network layer circuit; and
   said second instance of said network layer circuit is coupled to said data bus;
   said second line card comprises no instances of any physical layer circuit.

2. The system of claim 1, wherein
   Said second line card comprises a third instance of said network layer circuit; and
   Said third instance of said network layer circuit is coupled to said data bus.

3. The system of claim 1, wherein said second line card has a same form factor as said first line card.

4. The system of claim 1, wherein:
   said first line card comprises a second instance of said physical layer circuit; and
   said second instance of said physical layer circuit is operable to switch, in response to detecting a failure of said first instance of said network layer circuit, from processing of a signal received via said first instance of said network layer circuit to processing of a signal received via said interface.

5. The system of claim 4, wherein said first instance of said physical layer circuit is operable to, upon detection of a failure of said first instance of said physical layer circuit, communicate with said second instance of said physical layer circuit to effect a failover from said first instance of said physical layer circuit to said second instance of said physical layer circuit.

6. The system of claim 5, wherein:
   said first instance of said second circuit is coupled to a first power amplifier; and
   said second instance of said second circuit is coupled to a second power amplifier.

7. The system of claim 6, wherein said first instance of said physical layer circuit is operable to detect said failure via monitoring of an output of said first power amplifier.

8. The system of claim 1, wherein said data bus in an Ethernet data bus.

9. A method comprising:
   in a first line card comprising a first instance of a network layer circuit, a first instance of a physical layer circuit, and an interface to a data bus for communicating with a second line card:
   detecting failure of said first instance of said network layer circuit; and in response to detecting said failure of said first instance of said network layer circuit, reconfiguring said first instance of said physical layer circuit to switch from processing a signal received via first instance of said network layer circuit to processing of a signal received via said interface;
   wherein said second line card comprises a second instance of said network layer circuit; and
   wherein said second instance of said network layer circuit is coupled to said data bus;
   wherein said second line card comprises no instances of any physical layer circuit.

10. The system of claim 9, wherein
    Said second line card comprises a third instance of said network layer circuit; and
    Said third instance of said network layer circuit is coupled to said data bus.

11. The system of claim 9, wherein said second line card has a same form factor as said first line card.

12. The method of claim 9, wherein said first line card comprises a second instance of said physical layer circuit, and the method comprises:
    detecting a failure of said first instance of said network layer circuit; and
    in response to detecting said failure of said first instance of said network layer circuit, reconfiguring said second instance of said physical layer circuit to switch from processing a signal received via said first instance of said network layer circuit to processing a signal received via said interface.

13. The system of claim 12, wherein said first instance of said physical layer circuit is operable to, upon detecting a failure of said first instance of said physical layer circuit, communicate with said second instance of said physical layer circuit to effect a failover from said first instance of said physical layer circuit to said second instance of said physical layer circuit.

14. The system of claim 13, wherein:
    said first instance of said second circuit is coupled to a first power amplifier; and
    said second instance of said second circuit is coupled to a second power amplifier.

15. The system of claim 14, wherein said first instance of said physical layer circuit is operable to detect said failure by monitoring an output of said first power amplifier.

16. The system of claim 9, wherein said data bus in an Ethernet data bus.

* * * * *